(12) United States Patent
Damnjanovic et al.

(10) Patent No.: US 10,306,606 B2
(45) Date of Patent: May 28, 2019

(54) DECOUPLED TRANSMISSIONS OF CHANNEL QUALITY FEEDBACK AND ACKNOWLEDGEMENT/NEGATIVE-ACKNOWLEDGEMENT FEEDBACK

(71) Applicant: QUALCOMM Incorporated, San Diego, CA (US)

(72) Inventors: Aleksandar Damnjanovic, Del Mar, CA (US); Yisheng Xue, San Diego, CA (US); Juan Montojo, San Diego, CA (US); Jing Sun, San Diego, CA (US); Yongbin Wei, La Jolla, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 15/592,981

(22) Filed: May 11, 2017

(65) Prior Publication Data

US 2017/0339690 A1    Nov. 23, 2017

Related U.S. Application Data

(60) Provisional application No. 62/339,733, filed on May 20, 2016.

(51) Int. Cl.
*H04L 1/00* (2006.01)
*H04L 1/16* (2006.01)
(Continued)

(52) U.S. Cl.
CPC ...... *H04W 72/0413* (2013.01); *H04B 17/336* (2015.01); *H04L 1/0026* (2013.01);
(Continued)

(58) Field of Classification Search
None
See application file for complete search history.

(56) References Cited

U.S. PATENT DOCUMENTS 7,853,853 B2    12/2010  Demirhan et al.
8,457,091 B2     6/2013  Pani et al.
(Continued)

OTHER PUBLICATIONS

ISA/EP, International Search Report and Written Opinion of the International Searching Authority, Int'l Application No. PCT/US2017/032489, dated Jul. 28, 2017, European Patent Office, Rijswijk, NL, 15 pgs.
(Continued)

*Primary Examiner* — Yaotang Wang
(74) *Attorney, Agent, or Firm* — Liem T. Do

(57) ABSTRACT

Techniques are described for wireless communication at a user equipment (UE). One method includes receiving a downlink grant for a downlink transmission; transmitting channel quality feedback at a first time triggered by receipt of the downlink grant, the first time occurring during a first transmission time interval (TTI); and transmitting acknowledgement/negative-acknowledgement (ACK/NACK) feedback for the downlink transmission at a second time triggered by receipt of the downlink grant, the second time occurring during a second TTI, and the second TTI occurring later in time than the first TTI.

30 Claims, 13 Drawing Sheets

(51) Int. Cl.
*H04L 1/18* (2006.01)
*H04W 72/04* (2009.01)
*H04W 72/12* (2009.01)
*H04B 17/336* (2015.01)

(52) U.S. Cl.
CPC ......... *H04L 1/1671* (2013.01); *H04W 72/042* (2013.01); *H04W 72/1268* (2013.01); *H04L 1/1854* (2013.01)

(56) References Cited

U.S. PATENT DOCUMENTS

| | | |
|---|---|---|
| 8,477,734 B2 | 7/2013 | Sambhwani et al. |
| 9,295,041 B2 | 3/2016 | Cai et al. |
| 9,444,585 B2 | 9/2016 | Chunlong et al. |
| 2011/0249578 A1* | 10/2011 | Nayeb Nazar ........ H04L 1/0027 370/252 |
| 2011/0249584 A1* | 10/2011 | Barbieri ................ H04L 1/0026 370/252 |
| 2012/0039279 A1* | 2/2012 | Chen .................... H04L 1/1861 370/329 |
| 2015/0049699 A1 | 2/2015 | Takeda et al. |

OTHER PUBLICATIONS

Nokia et al., "UCI Transmission on LAA SCells," 3GPP TSG-RAN WG2 Meeting #85, R1-164920, Nanjing, China, May 23-27, 2016, 4 pgs., XP051090211, 3rd Generation Partnership Project.

ZTE, "Analysis of LAA UL Enhancement," 3GPP TSG RAN WG1 Meeting #79, R1-144830, San Francisco, USA, Nov. 17-21, 2014, 5 pgs., XP050885502, 3rd Generation Partnership Project.

\* cited by examiner

DECOUPLED TRANSMISSIONS OF CHANNEL QUALITY FEEDBACK AND ACKNOWLEDGEMENT/NEGATIVE-ACKNOWLEDGEMENT FEEDBACK

CROSS REFERENCES

The present Application for Patent claims priority to U.S. Provisional Patent Application No. 62/339,733 by Damnjanovic, et al., entitled "Decoupled Transmissions of Channel quality Feedback and Acknowledgement/Negative-Acknowledgement Feedback," filed May 20, 2016, assigned to the assignee hereof.

BACKGROUND

The following relates generally to wireless communication, and more specifically to decoupled transmissions of channel quality feedback and acknowledgement/negative-acknowledgement (ACK/NACK) feedback.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communication system may include a number of base stations, each simultaneously supporting communication for multiple communication devices, which may be otherwise known as user equipment (UE).

When communicating with a UE, a base station may adapt the parameters of transmissions over a communication link (or link, or channel) between the base station and UE. The adapted parameters may include, for example, a modulation and coding scheme (MCS), a rank indicator (RI), or a pre-coding matrix indicator (PMI). In an LTE system, link adaptation may be based on ACK/NACK feedback transmitted by a UE to a base station in accordance with one or more hybrid automatic repeat request (HARD) processes, or on channel quality information (CQI) reports transmitted with ACK/NACK feedback.

SUMMARY

The described techniques relate to improved methods, systems, devices, or apparatuses that support decoupled transmissions of channel quality feedback and ACK/NACK feedback. In low latency systems, it may be desirable to perform link adaptation faster than what is supported by HARQ and CQI reporting/processing timelines. In some cases, faster link adaptation may be enabled by decoupling transmissions of channel quality feedback and ACK/NACK feedback, and by transmitting channel quality feedback to a base station one or more transmission time intervals (TTIs) before transmitting ACK/NACK feedback to the base station. One type of channel quality feedback that may be generated quickly (or early) is a signal-to-noise-plus-interference ratio (SNIR). For example, a decoding SNIR may be generated to enable the decoding of a downlink transmission, while ACK/NACK feedback or a CQI report may not be generated until after completion of the decoding. In some examples, decoding SNIR may refer to the SNIR being computed over a block of resources associated with one or more previous (e.g., last) transmissions.

A method of wireless communication is described. The method may include receiving a downlink grant for a downlink transmission, transmitting channel quality feedback at a first time triggered by receipt of the downlink grant, the first time occurring during a first TTI, and transmitting ACK/NACK feedback for the downlink transmission at a second time triggered by receipt of the downlink grant, the second time occurring during a second TTI, and the second TTI occurring later in time than the first TTI.

An apparatus for wireless communication is described. The apparatus may include means for receiving a downlink grant for a downlink transmission, means for transmitting channel quality feedback at a first time triggered by receipt of the downlink grant, the first time occurring during a first TTI, and means for transmitting ACK/NACK feedback for the downlink transmission at a second time triggered by receipt of the downlink grant, the second time occurring during a second TTI, and the second TTI occurring later in time than the first TTI.

Another apparatus for wireless communication is described. The apparatus may include a processor, memory in electronic communication with the processor, and instructions stored in the memory. The instructions may be operable to cause the processor to receive a downlink grant for a downlink transmission, transmit channel quality feedback at a first time triggered by receipt of the downlink grant, the first time occurring during a first TTI, and transmit ACK/NACK feedback for the downlink transmission at a second time triggered by receipt of the downlink grant, the second time occurring during a second TTI, and the second TTI occurring later in time than the first TTI.

A non-transitory computer readable medium for wireless communication is described. The non-transitory computer-readable medium may include instructions operable to cause a processor to receive a downlink grant for a downlink transmission, transmit channel quality feedback at a first time triggered by receipt of the downlink grant, the first time occurring during a first TTI, and transmit ACK/NACK feedback for the downlink transmission at a second time triggered by receipt of the downlink grant, the second time occurring during a second TTI, and the second TTI occurring later in time than the first TTI.

In some examples of the method, apparatus, or non-transitory computer-readable medium described above, the channel quality feedback may include a SNIR. Some examples of the method, apparatus, or non-transitory computer-readable medium described above may further include processes, features, means, or instructions for determining whether an indicator that CQI reporting during the first TTI is scheduled is received. Some examples of the method, apparatus, or non-transitory computer-readable medium described above may further include processes, features, means, or instructions for refraining from transmitting CQI feedback during the first TTI. Some examples of the method, apparatus, or non-transitory computer-readable medium described above may further include processes, features, means, or instructions for transmitting CQI feedback during the first TTI. In some examples of the method, apparatus, or non-transitory computer-readable medium described above, the indicator that CQI reporting during the first TTI is scheduled may include one or more of: a first indicator that ACK/NACK feedback during the first TTI is scheduled, or a second indicator that a physical uplink shared channel (PUSCH) transmission during the first TTI is scheduled.

Some examples of the method, apparatus, or non-transitory computer-readable medium described above may further include processes, features, means, or instructions for generating the SNIR when generating a channel estimate used to decode the downlink transmission, or prior to finishing a decode of the downlink transmission. Some examples of the method, apparatus, or non-transitory computer-readable medium described above may further include processes, features, means, or instructions for generating the SNIR based at least in part on a set of frequencies on which the downlink transmission is scheduled in the downlink grant.

In some examples of the method, apparatus, or non-transitory computer-readable medium described above, the SNIR may include a decoding SNIR. Some examples of the method, apparatus, or non-transitory computer-readable medium described above may further include processes, features, means, or instructions for receiving a first uplink grant scheduling the channel quality feedback. Some examples of the method, apparatus, or non-transitory computer-readable medium described above may further include processes, features, means, or instructions for receiving a second uplink grant scheduling the ACK/NACK feedback. In some examples of the method, apparatus, or non-transitory computer-readable medium described above, the first uplink grant is received in downlink control information (DCI) or radio resource control (RRC) signaling.

Some examples of the method, apparatus, or non-transitory computer-readable medium described above may further include processes, features, means, or instructions for receiving, in DCI or RRC signaling, an indicator that decoupled reporting of channel quality feedback and ACK/NACK feedback is triggered. In some examples of the method, apparatus, or non-transitory computer-readable medium described above, the ACK/NACK feedback may include one or more of: an ACK or a NACK. In some examples of the method, apparatus, or non-transitory computer-readable medium described above, the first TTI may include a first subframe, and the second TTI may include a second subframe. In some examples of the method, apparatus, or non-transitory computer-readable medium described above, the first TTI occurs two TTIs after a TTI in which the downlink grant is received, and the second TTI occurs four TTIs after the TTI in which the downlink grant is received. In some examples of the method, apparatus, or non-transitory computer-readable medium described above, the first TTI occurs two TTIs after a TTI in which the downlink grant is received, and the second TTI occurs three TTIs after the TTI in which the downlink grant is received.

DETAILED DESCRIPTION

Techniques are described in which transmissions of channel quality feedback are decoupled from transmissions of ACK/NACK feedback. The decoupling enables a UE to transmit certain types of channel quality feedback to a base station at an earlier time (e.g., in an earlier TTI or subframe). One type of channel quality feedback that may be generated and transmitted earlier is a SNIR, such as a decoding SNIR used to enable the decoding of a downlink transmission. In some examples, decoding SNIR may refer to the SNIR being computed over a block of resources associated with one or more previous (e.g., last or most recent) transmissions. A decoding SNIR may be generated, for example, when a UE generates a channel estimate used to decode a downlink transmission, or prior to finishing the decode of the downlink transmission. These times are earlier than when a UE can generate ACK/NACK feedback or a CQI report.

Aspects of the disclosure are initially described in the context of a wireless communication system. Aspects of the disclosure are then described in the context of a process flow and transmission timelines. Aspects of the disclosure are further illustrated by and described with reference to apparatus diagrams, system diagrams, and flowcharts that relate to decoupled transmissions of channel quality feedback and ACK/NACK feedback.

Figure 1:
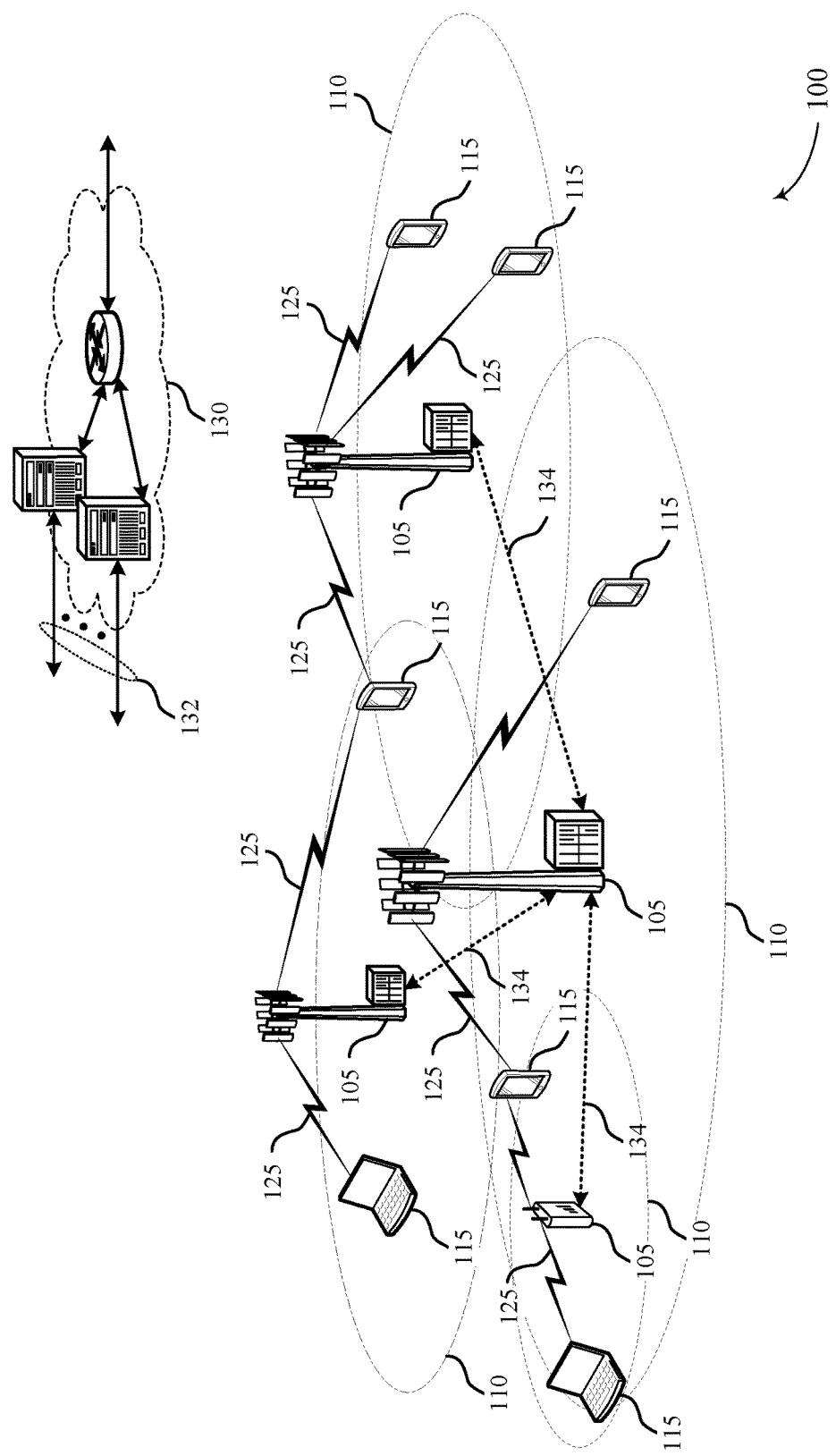
FIG. 1 illustrates an example of a system for wireless communication that supports decoupled transmissions of channel quality feedback and ACK/NACK feedback in accordance with various aspects of the present disclosure.

FIG. 1 illustrates an example of a wireless communication system 100 that supports decoupled transmissions of channel quality feedback and ACK/NACK feedback in accordance with various aspects of the present disclosure. The present disclosure describes various techniques with reference to or that may be applied in next generation networks (e.g., 5G or new radio (NR) networks) that are being designed to support distinct features such as high bandwidth operations. The wireless communication system 100 includes base stations 105, UEs 115, and a core network 130. In some examples, the wireless communication system 100 may include a LTE (or LTE-Advanced) network. In some examples, the wireless communication system 100 may be or include a 5G or NR network. As described in the present disclosure, the base stations 105 may receive channel quality feedback and ACK/NACK feedback from UEs 115 in accordance with different link adaptation processes having different timelines. A first link adaptation process may be based on channel quality feedback, such as a SNIR (e.g., a decoding SNIR), which a UE 115 may be able to transmit to a base station faster than ACK/NACK feedback associated with a second link adaptation process (e.g., a HARQ process).

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. UEs 115 may be dispersed throughout the wireless communication system 100, and each UE 115 may be stationary or mobile. A UE 115 may additionally or alternatively be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a Machine Type Communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105 or gnodeBs (gNBs) 105.

Carriers may transmit bidirectional communications using frequency division duplexing (FDD) (e.g., using paired spectrum resources) or time division duplexing (TDD) (e.g., using unpaired spectrum resources). Frame structures or configurations for FDD (e.g., frame structure type 1) and TDD (e.g., frame structure type 2) may be defined. Use of TDD may offer flexible deployments without paired UL-DL spectrum resources. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL traffic (e.g., via downlink pilot time slot (DwPTS)) or UL traffic (e.g., via uplink pilot time slot (UpPTS)) and may include a Guard Period (GP) between DL and UL traffic. Switching from UL to DL traffic may be achieved by setting a timing advance (TA) at the UE 115 without the use of special subframes or a guard period.

Time intervals in LTE may be expressed in multiples of a basic time unit (e.g., the sampling period, $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods.

A frame structure may be used to organize physical resources. A frame may be a 10 ms interval that may be further divided into 10 equally sized sub-frames. Each sub-frame may include two consecutive time slots. Each slot may include six or seven OFDMA symbol periods. A resource element comprises of one symbol period and one subcarrier (a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. Some resource elements may include DL reference signals (DL-RS). The DL-RS may include a cell-specific reference signal (CRS) and a UE-specific RS (UE-RS). UE-RS may be transmitted on the resource blocks associated with physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be.

A TTI may be defined as the smallest unit of time in which a base station 105 may schedule a UE 115 for UL or DL transmission. For example, if a UE 115 is receiving DL data, then during each TTI a base station 105 may assign resources and indicate (via downlink control transmissions) to the UE 115 where to look for its DL data. In some cases, a subframe may be the basic unit of scheduling or TTI. In other cases, such as with low latency operation, a different, reduced-duration TTI (e.g., a short TTI) may be used. A reduced-duration or short TTI may have a duration of a symbol period, a pair of symbol periods, a slot (i.e., half of a subframe), or other durations less than 1 ms. TTIs for low latency operation may thus have a numerology that is compatible with other LTE transmission structures and timing (e.g., subframe). The wireless communications system 100 may concurrently support communication using TTIs over different duration (e.g., TTIs having a duration of a subframe and TTIs having a duration of a symbol period or a slot).

System 100 may support communications according to a protocol organized into different layers. At the physical layer, a physical downlink control channel (PDCCH) may carry DCI in control channel elements (CCEs), which may comprise of nine logically contiguous resource element groups (REGs), where each REG contains 4 resource elements (REs). DCI includes information regarding DL scheduling assignments, UL resource grants, transmission scheme, UL power control, HARQ information, MCS and other information. physical uplink control channel (PUCCH) may be used for UL acknowledgements (ACKs), scheduling requests (SRs) and CQI and other UL control information. A physical uplink control channel (e.g., PUCCH) may be mapped to a control channel defined by a code and two consecutive resource blocks. UL control signaling may depend on the presence of timing synchronization for a cell. PUCCH resources for SR and CQI reporting may be assigned (and revoked) through RRC signaling.

Within system 100 or similar systems, HARQ may be a method of ensuring that data is received correctly over a communication link 125. HARQ may include a combination of error detection (e.g., using a cyclic redundancy check (CRC)), forward error correction (FEC), and retransmission (e.g., automatic repeat request (ARQ)). The chain of transmission, response and retransmission may be referred to as a HARQ process. HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data.

The response in a HARQ process may include an ACK indicating a successful attempt to decode information and a negative-acknowledgement (NACK) indicating a failed attempt to decode the information. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125. A time delay may determine or dictate when HARQ feedback is transmitted on the UL. That is, the TTI scheduled for HARQ feedback transmission may be associated with a predetermined delay (e.g., feedback timing) from the DL reception TTI.

To maintain synchronization with the base station 105, the UE 115 may transmit based on a TA value. The TA value may account for signal propagation delay due to the geographic distance between a UE 115 and the base station 105. The base station 105 or the UE 115 may determine the signal propagation delay. In an example, TA may change over time as the physical distance between a UE 115 and the base station 105 changes. When the UE 115 and base station 105 are geographically closer, the signal propagation delay may be shorter and, when geographically farther apart, the signal propagation delay may be longer. The UE 115 may use the TA value to determine when to send a signal such that the base station 105 receives the signal at the correct time along a timeline in accordance with the reception of other signals from other UEs 115.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may additionally or alternatively be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

An eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may comprise of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may comprise of one or multiple symbols. In some cases, the TTI duration (that is, the number of symbols in a TTI) may be variable.

HARQ may be a method of ensuring that data is received correctly over a communication link 125. HARQ may include a combination of error detection (e.g., using a CRC), FEC, and retransmission (e.g., ARQ). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125.

Figure 2:
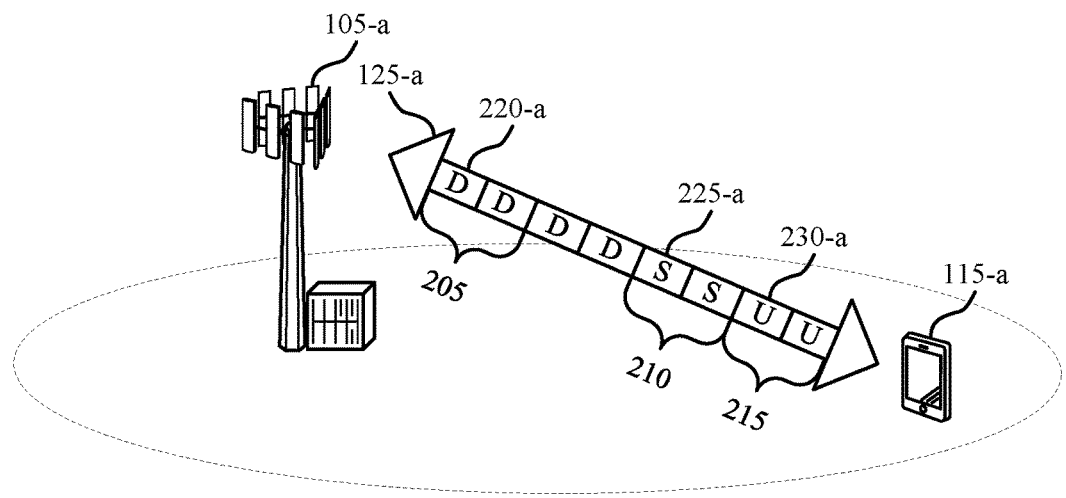
FIG. 2 illustrates an example of a wireless communication system that supports decoupled transmissions of channel quality feedback and ACK/NACK feedback in accordance with various aspects of the present disclosure.

FIG. 2 illustrates an example of a wireless communication system 200 that supports decoupled transmissions of channel quality feedback and ACK/NACK feedback in accordance with various aspects of the present disclosure. In some cases, wireless communication system 200 may represent aspects of techniques performed by a UE 115 or base station 105 as described with reference to FIG. 1.

Wireless communication system 200 may be an example of a subframe-level TTI or shortened TTI system employing bidirectional communication using TDD. An example base station 105-a and UE 115-a may support subframe-level TTI HARQ feedback or shortened TTI HARQ feedback over communication link 125-a. Downlink subframes 205 (or TTIs) may in some cases include downlink (D) TTIs 220, special subframes 210 may include special (S) TTIs 225, and uplink subframes 215 may include uplink (U) TTIs 230.

HARQ feedback timing may be based on a subframe-level TTI duration or a shortened TTI duration (e.g., a slot TTI or two-symbol TTI). A shortened TTI (e.g., D TTIs 220, S TTIs 225, and U TTIs 230) may allow for reduced turnaround time and a shorter HARQ feedback delay. HARQ feedback delays associated with other wireless communication systems (e.g., predetermined time period delays associated with subframe durations) may be applied to shortened TTIs in low latency systems. The predetermined time may be a number, k, TTIs after a D TTI 220. For example, HARQ timing may follow an N+k rule where N is the D TTI 220 and N+k is the soonest TTI available for HARQ feedback (e.g., if N+k is a U TTI 230). That is, if N is D TTI 220-a and k=4, HARQ feedback may be handled by U TTI 230-a, as U TTI 230-a is the next TTI available for uplink transmissions and additionally or alternatively satisfies the N+4 rule. In some cases, a two-symbol D TTI and one-slot U TTI system may support HARQ feedback using shortened TTIs. For example, U slot TTIs may carry two-symbol TTI transmissions from a downlink subframe 205 (e.g., U slot TTIs carry seven (7) two-symbol TTIs from a previous downlink subframe).

Figure 3:
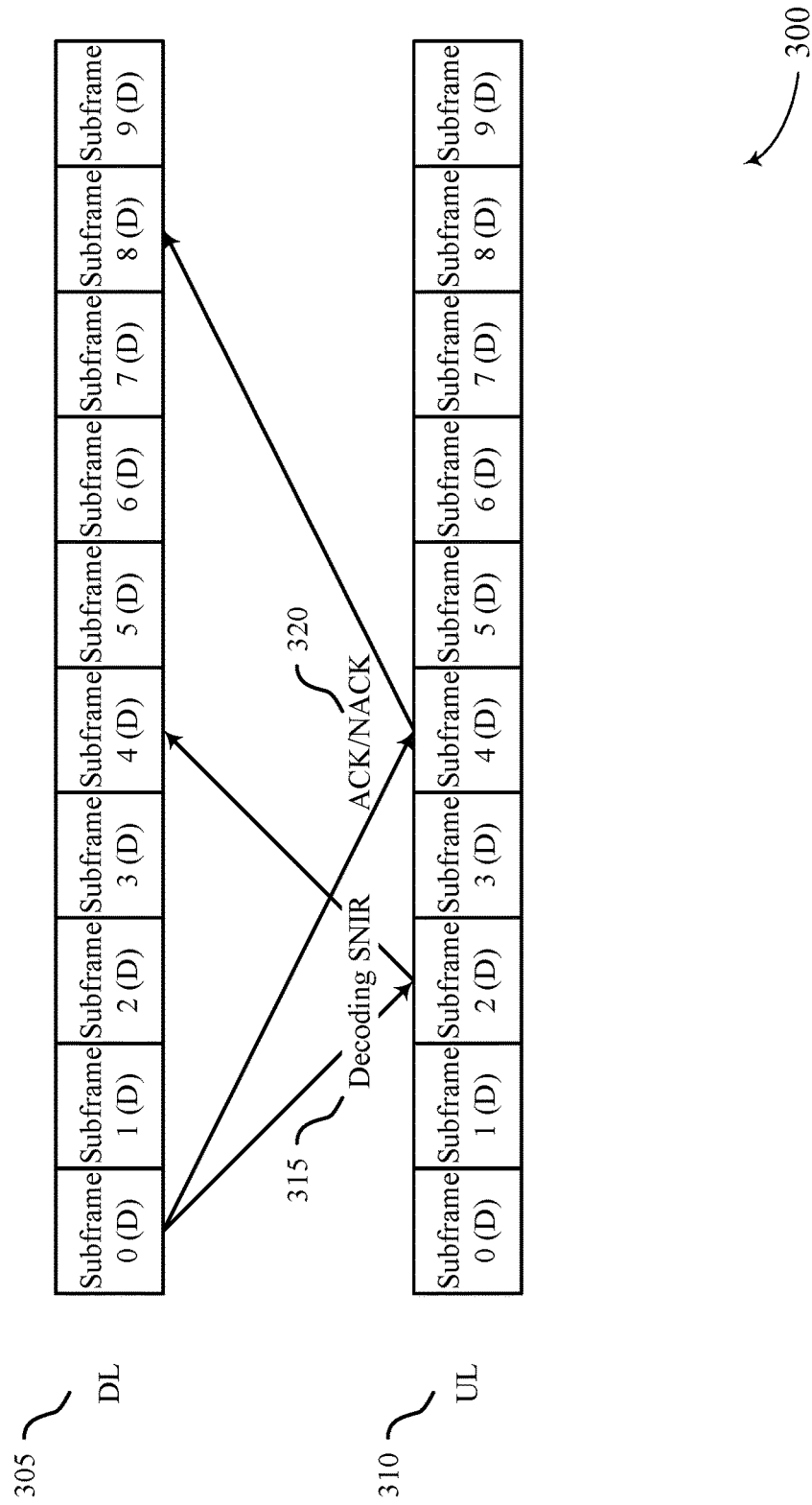
FIG. 3 illustrates an example of a timeline for decoupled transmissions of channel quality feedback and ACK/NACK feedback in accordance with various aspects of the present disclosure.

FIG. 3 illustrates an example of a timeline 300 for decoupled transmissions of channel quality feedback and ACK/NACK feedback in accordance with various aspects of the present disclosure. In some cases, timeline 300 may represent aspects of techniques performed by a UE 115 or base station 105 as described with reference to FIGS. 1 and 2. The timeline 300 includes a plurality of subframes, numbered 0 through 9. In some examples, subframes 0 through 9 may define a radio frame. The timeline 300 shows DL transmissions 305 (e.g., transmissions by a base station) and UL transmissions 310 (e.g., transmissions by a UE) during subframes 0 through 9.

During subframe 0, a base station may transmit, to a UE, a downlink grant for a downlink transmission. The base station may additionally or alternatively transmit the downlink transmission. Transmission of the downlink grant (or DCI) in subframe 0 may trigger two link adaptation processes. A first link adaptation process 315 (including, for example, rate control) may have a four subframe (or four TTI) periodicity, while a second link adaptation process 320 may have an eight subframe (or eight TTI) periodicity. In some examples, the second link adaptation process 320 may be a HARQ process based on ACK/NACK feedback (e.g., the second link adaptation process 320 may be transmission feedback-centric).

The first link adaptation process 315 may be decoupled from the second link adaptation process 320 and may be based on channel quality feedback such as a SNIR or decoding SNIR (e.g., the first link adaptation process 315 may be channel feedback-centric). A decoding SNIR may be generated by the UE when the UE generates a channel estimate used to decode the downlink transmission, or prior to finishing the decode of the downlink transmission. In some examples, decoding SNIR may refer to the SNIR being computed over a block of resources associated with one or more previous (e.g., last or most recent) transmissions. Thus, a decoding SNIR may be generated faster than CQI feedback (e.g., a CQI report). By providing the UE an uplink grant for transmission of the decoding SNIR in an earlier subframe than ACK/NACK feedback, the base station may enable earlier link adaptation using the first link adaptation process 315 (e.g., earlier link adaptation than may be possible using the second link adaptation process 320, based on reporting a decoding SNIR at an interval of N+k, where k=2).

Figure 4:
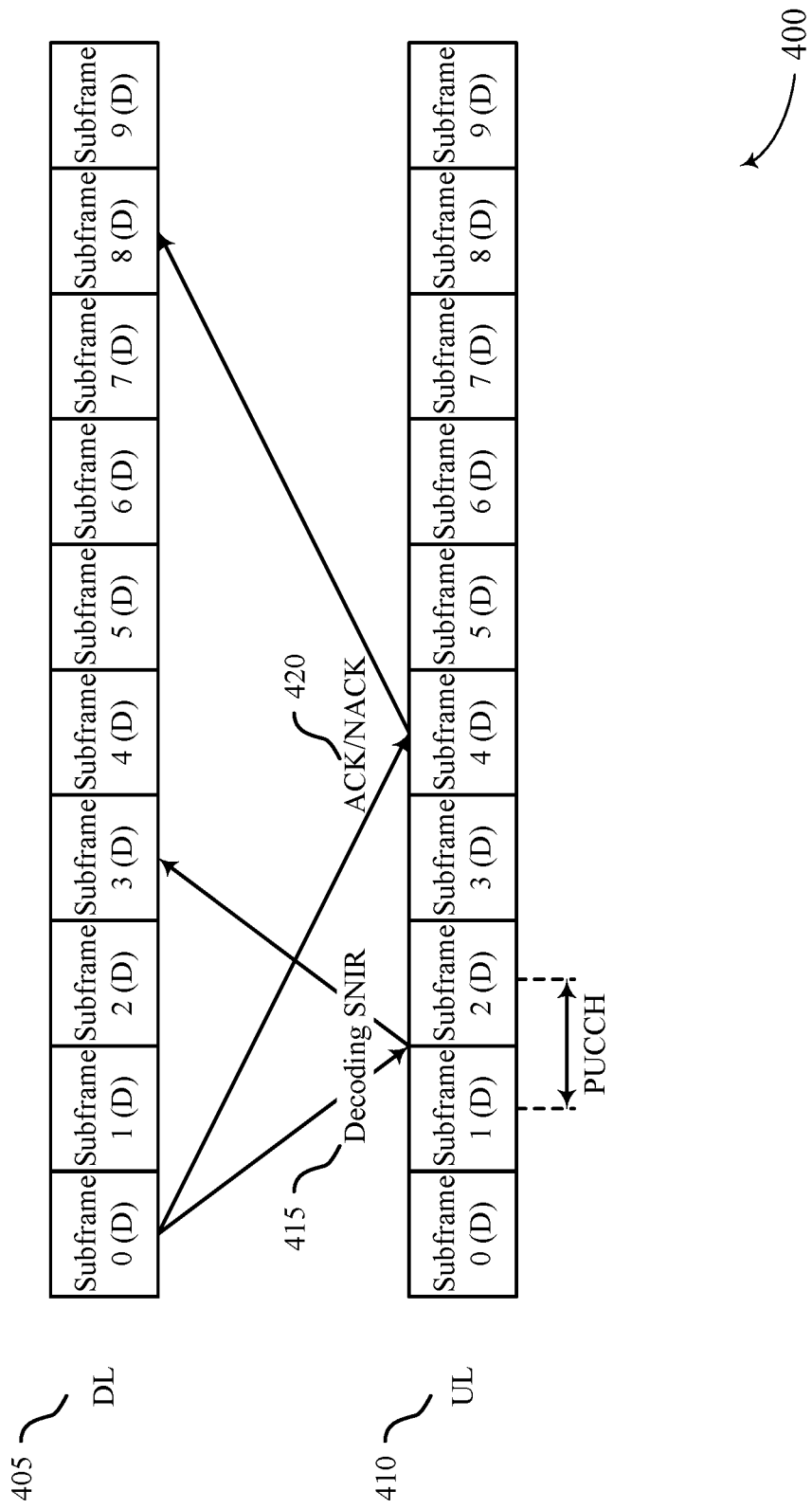
FIG. 4 illustrates an example of a timeline for decoupled transmissions of channel quality feedback and ACK/NACK feedback in accordance with various aspects of the present disclosure.

FIG. 4 illustrates an example of a timeline 400 for decoupled transmissions of channel quality feedback and ACK/NACK feedback in accordance with various aspects of the present disclosure. In some cases, timeline 400 may represent aspects of techniques performed by a UE 115 or base station 105 as described with reference to FIGS. 1 and 2. The timeline 400 includes a plurality of subframes, numbered 0 through 9. In some examples, subframes 0 through 9 may define a radio frame. The timeline 400 shows DL transmissions 405 (e.g., transmissions by a base station) and UL transmissions 410 (e.g., transmissions by a UE) during subframes 0 through 9.

During subframe 0, a base station may transmit, to a UE, a downlink grant for a downlink transmission. The base station may additionally or alternatively transmit the downlink transmission. Transmission of the downlink grant (or DCI) in subframe 0 may trigger two link adaptation processes. A first link adaptation process 415 (including, for example, rate control) may have a three subframe (or three TTI) periodicity, while a second link adaptation process 420 may have an eight subframe (or eight TTI) periodicity. In some examples, the second link adaptation process 420 may be a HARQ process based on ACK/NACK feedback (e.g., the second link adaptation process 420 may be transmission feedback-centric).

The first link adaptation process 415 may be decoupled from the second link adaptation process 420 and may be based on channel quality feedback such as a SNIR or decoding SNIR (e.g., the first link adaptation process 415 may be channel feedback-centric). A decoding SNIR may be generated by the UE when the UE generates a channel estimate used to decode the downlink transmission, or prior to finishing the decode of the downlink transmission. Thus, a decoding SNIR may be generated faster than CQI feedback (e.g., a CQI report). By providing the UE an uplink grant for transmission of the decoding SNIR in an earlier subframe than ACK/NACK feedback, the base station may enable earlier link adaptation using the first link adaptation process 415 (e.g., earlier link adaptation than may be possible using the second link adaptation process 420, based on reporting a decoding SNIR at an interval of N+k, where k=1.5).

In some examples, the three subframe periodicity of the first link adaptation process 415 may be facilitated by an uplink control channel (e.g., a PUCCH) that spans a second slot of subframe 1 and first slot of subframe 2.

Figure 5:
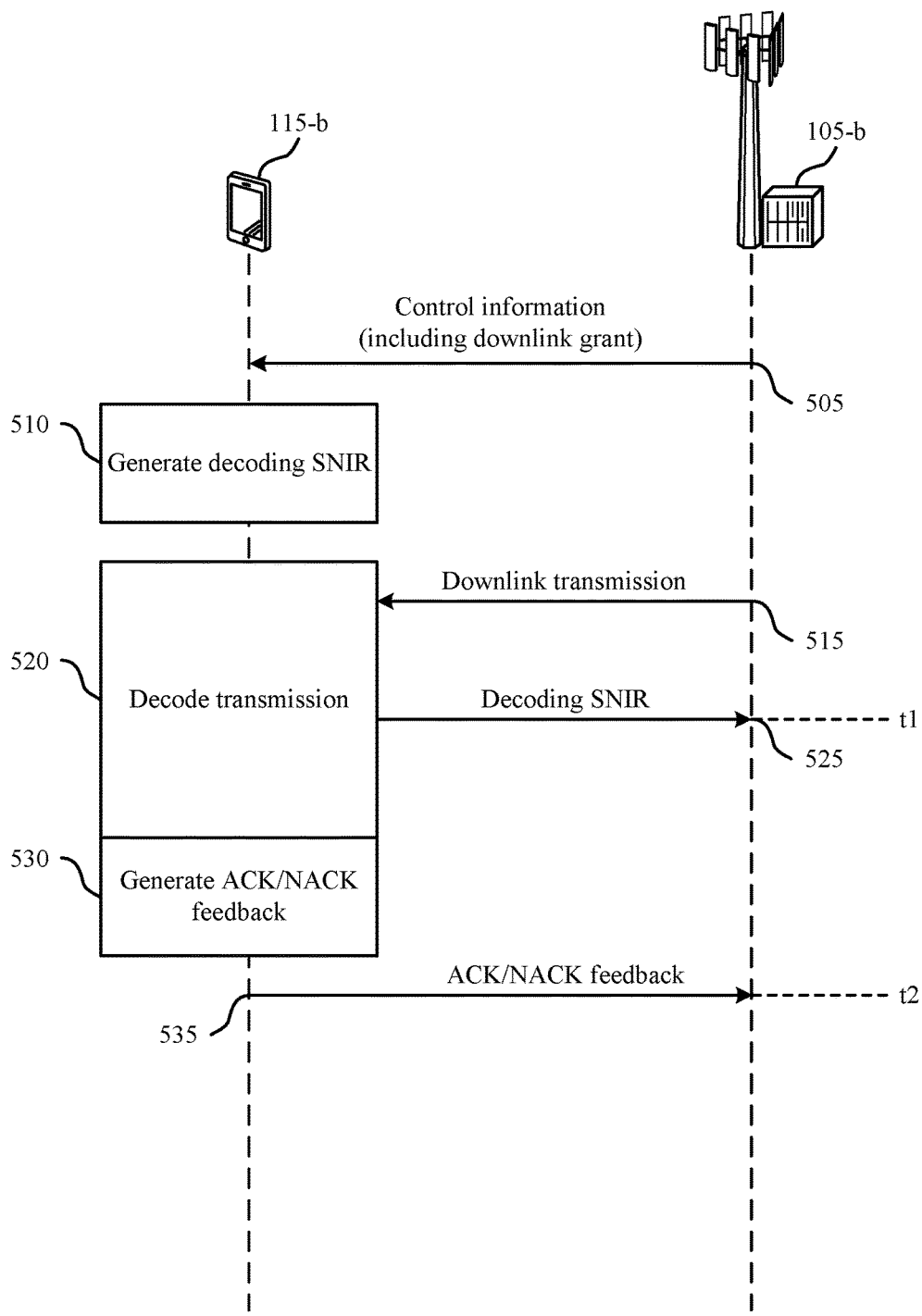
FIG. 5 illustrates an example of a process flow that supports decoupled transmissions of channel quality feedback and ACK/NACK feedback in accordance with various aspects of the present disclosure.

FIG. 5 shows a process flow 500 that supports decoupled transmissions of channel quality feedback and ACK/NACK feedback in accordance with various aspects of the present disclosure. In some cases, process flow 500 may represent aspects of techniques performed by a UE 115 or base station 105 as described with reference to FIGS. 1 and 2.

At 505, UE 115-*b* may receive control information from base station 105-*b*. The control information may include a downlink grant for a downlink transmission. In some examples, the downlink grant may be received in DCI. In some examples, the control information may additionally or alternatively include other DCI or other control information (e.g., control information received in RRC signaling). For example, the control information received at 505 may include an indicator that decoupled reporting of channel quality feedback and ACK/NACK feedback is triggered. In some examples, the indicator that decoupled reporting of channel quality feedback and ACK/NACK feedback is triggered may be received in DCI or RRC signaling. In some examples, the indicator that decoupled reporting of channel quality feedback and ACK/NACK feedback is triggered may be received in DCI received in a same TTI as the downlink grant. In some examples, the indicator that decoupled reporting of channel quality feedback and ACK/NACK feedback is triggered may be received in RRC signaling received prior to the TTI in which the downlink grant is received (e.g., similarly to, or as a part of, semi-persistent scheduling (SPS) information). When the indicator that decoupled reporting of channel quality feedback and ACK/NACK feedback is triggered is provided in RRC signaling, the indicator may trigger decoupled reporting of channel quality feedback and ACK/NACK feedback every time a downlink grant (or DCI) is received. Providing the indicator that decoupled reporting of channel quality feedback and ACK/NACK feedback is triggered in RRC signaling may also help reduce the size of DCI.

In some examples, the control information received at 505 may include an indicator that CQI reporting during a first TTI is scheduled. In some examples, the indicator that CQI reporting during the first TTI is scheduled may include one or both of: a first indicator that ACK/NACK feedback during the first TTI is scheduled, or a second indicator that a PUSCH transmission during the first TTI is scheduled. In some examples, the indicator may include a downlink grant.

In some examples, the control information received at 505 may include a first uplink grant scheduling the channel quality feedback. In some examples, the first uplink grant may be received in DCI or RRC signaling. In some examples, receipt of the first uplink grant may be the indicator that decoupled reporting of channel quality feedback and ACK/NACK feedback is triggered. In some examples, the control information received at 505 may additionally or alternatively include a second uplink grant scheduling the ACK/NACK feedback. In some examples, the second uplink grant may be received in DCI, such as DCI received in a same TTI as the downlink grant.

The control information received at 505 may be received in a single transmission or over multiple transmissions. In some examples, all of the control information may be received before UE 115-*b* begins receiving the downlink transmission at 515. In other examples, some of the control information may be received before UE 115-*b* begins receiving the downlink transmission at 515, and some of the control information may be received after UE 115-*b* begins receiving the downlink transmission. The control information may be received in one TTI or over multiple TTIs.

At 510, UE 115-*b* may generate channel quality feedback. The channel quality feedback may be generated when UE 115-*b* generates a channel estimate used to decode the downlink transmission associated with the downlink grant received at 505, or prior to finishing the decode of the downlink transmission at 520, or based on a set of frequencies on which the downlink transmission is scheduled in the downlink grant. The generated channel quality feedback may include a SNIR (e.g., a decoding SNIR used to estimate the channel over which the downlink transmission is received at 515).

At 515, UE 115-*b* may receive the downlink transmission (e.g., a PUSCH transmission) from base station 105-*b*, and at 520, UE 115-*b* may decode the downlink transmission. In some examples, the operations performed by UE 115-*b* at 510 and 520 may partially overlap.

At 525, UE 115-*b* may transmit the channel quality feedback (e.g., a decoding SNIR) generated at 510. The channel quality feedback may be transmitted at a first time (e.g., time t1) triggered by receipt of the downlink grant at 505. The first time may occur during the first TTI. In some examples, the channel quality feedback may be transmitted on a PUCCH.

In some examples, CQI feedback may also be transmitted at 525. In some examples, UE 115-*b* may transmit CQI feedback during the first TTI when the control information received at 505 includes an indicator that CQI reporting during the first TTI is scheduled during the first TTI. In these examples, CQI feedback may be transmitted regardless of whether a SNIR is additionally or alternatively transmitted during the first TTI. Thus, in these examples, the CQI feedback may be transmitted along with a SNIR (or decoding SNIR) during the first TTI. Alternatively, CQI feedback may be given priority and transmitted instead of channel quality feedback such as a SNIR. In other examples, UE 115-*b* may refrain from transmitting CQI feedback during the first TTI when the control information received at 505 includes an indicator that CQI reporting during the first TTI is scheduled. For example, UE 115-*b* may be configured to refrain from transmitting CQI feedback when a SNIR is transmitted during the first TTI. When the control information received at 505 does not include an indicator that CQI reporting during the first TTI is scheduled, UE 115-*b* may refrain from transmitting CQI feedback during the first TTI.

In some examples, the channel quality feedback transmitted at 525 may be transmitted on separate PUCCH resources configured with RRC signaling. In other examples, the channel quality feedback transmitted at 525 may be transmitted on PUCCH resources for transmitting a decoding SNIR or the like, which PUCCH resources may be mapped to one or a set of new PDCCH CCEs. In the latter examples, the mapping may be the same as for ACK/NACK feedback mapping, but PUCCH format 2 resources may be utilized instead of PUCCH format 1 resources; or PUCCH format 4 resources may be utilized in the case of CA. The transmission of channel quality feedback at 525 can enable the statistical multiplexing or resources.

At 530, upon completing the decoding of the transmission at 520, UE 115-*b* may generate ACK/NACK feedback and optionally generate CQI feedback. In some examples, the operations performed by UE 115-*b* at 520 and 530 may partially overlap.

At 535, UE 115-*b* may transmit ACK/NACK feedback for the downlink transmission received at 515. The ACK/NACK feedback may be transmitted at a second time (e.g., time t2) triggered by receipt of the downlink grant. The second time may occur during a second TTI. The second TTI may occur later in time than the first TTI. In some examples, the ACK/NACK feedback may include one or both of an ACK or a NACK. In some examples, the ACK/NACK feedback may include a combination of ACKs and/or NACKs.

In some examples of the process flow 500, the first TTI (including time t1) may include a first subframe, and the second TTI (including time t2) may include a second subframe. In some examples, the first TTI may occur two TTIs after a TTI in which the downlink grant is received by UE 115-*b*, and the second TTI may occur four TTIs after the TTI in which the downlink grant is received, as described with reference to FIG. 3. In some examples, the first TTI may occur two TTIs after a TTI in which the downlink grant is received by UE 115-*b*, and the second TTI may occur three TTIs after the TTI in which the downlink grant is received, as described with reference to FIG. 4.

Figure 6:
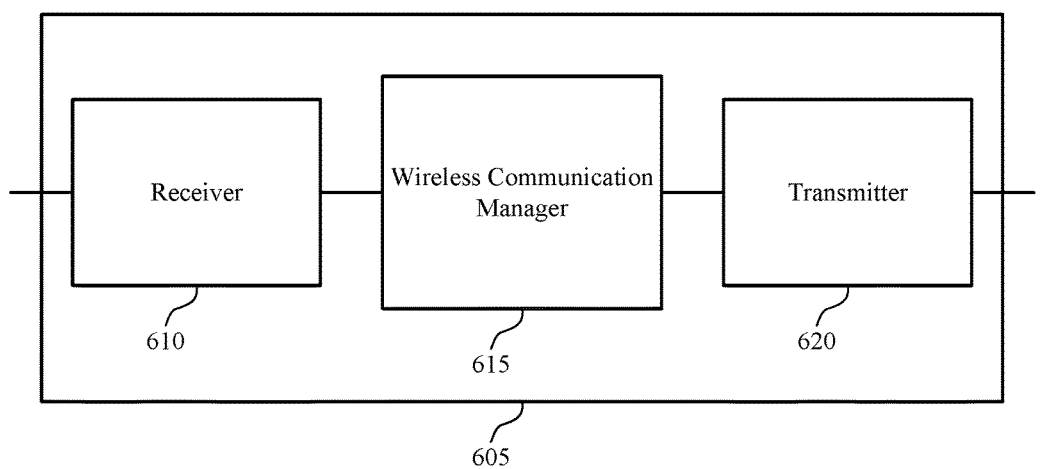
FIGS. 6 through 8 show diagrams of a device that supports decoupled transmissions of channel quality feedback and ACK/NACK feedback in accordance with various aspects of the present disclosure.

FIG. 6 shows a diagram 600 of a wireless device 605 that supports decoupled transmissions of channel quality feedback and ACK/NACK feedback in accordance with various aspects of the present disclosure. Wireless device 605 may be an example of aspects of a UE 115 as described with reference to FIG. 1. Wireless device 605 may include receiver 610, wireless communication manager 615, and transmitter 620. Wireless device 605 may also include a processor. Each of these components may be in communication with one another directly or indirectly (e.g., via one or more buses).

Receiver 610 may receive information such as packets, user data, or control information associated with various information channels (e.g., control channels, data channels, information related to decoupled transmissions of channel quality feedback and ACK/NACK feedback, etc.). Information may be passed on to other components of the wireless device 605. The receiver 610 may be an example of aspects of the transceiver 940 described with reference to FIG. 9. The receiver 610 may include or be associated with a single antenna, or may include or be associated with a set of antennas.

Wireless communication manager 615 may be an example of aspects of the wireless communication manager 915 described with reference to FIG. 9. Wireless communication manager 615 may receive a downlink grant for a downlink transmission, transmit channel quality feedback at a first time triggered by receipt of the downlink grant, and transmit ACK/NACK feedback for the downlink transmission at a second time triggered by receipt of the downlink grant. The first time, at which the channel quality feedback is transmitted, may occur during a first TTI. The second time, at which the ACK/NACK feedback is transmitted, may occur during a second TTI. The second TTI may occur later in time than the first TTI.

Transmitter 620 may transmit signals generated by other components of the wireless device 605 (e.g., channel quality feedback or ACK/NACK feedback). In some examples, the transmitter 620 may be collocated with the receiver 610 in a transceiver. For example, the transmitter 620 may be an example of aspects of the transceiver 940 described with reference to FIG. 9. The transmitter 620 may include or be associated with a single antenna, or may include or be associated with a set of antennas, and in some examples may share one or more antennas with the receiver 610.

Figure 7:
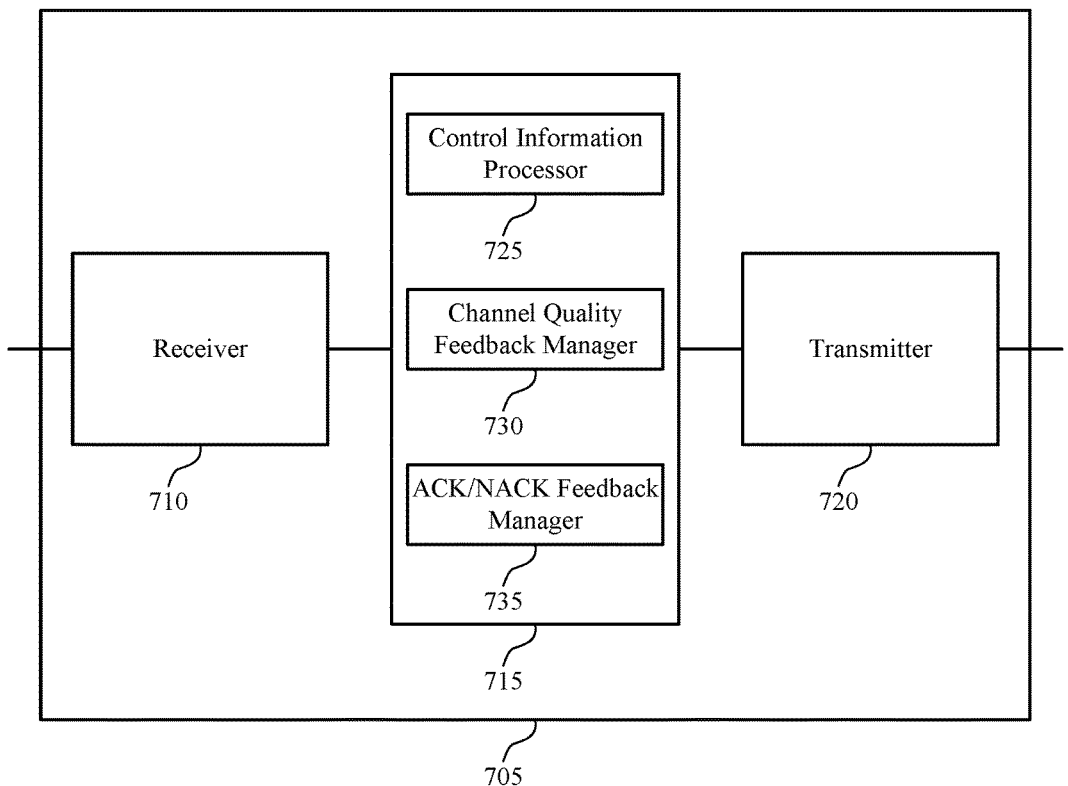

FIG. 7 shows a diagram 700 of a wireless device 705 that supports decoupled transmissions of channel quality feedback and ACK/NACK feedback in accordance with various aspects of the present disclosure. Wireless device 705 may be an example of aspects of a wireless device 605 or a UE 115 as described with reference to FIGS. 1 and 6. Wireless device 705 may include receiver 710, wireless communication manager 715, and transmitter 720. Wireless device 705 may also include a processor. Each of these components may be in communication with one another directly or indirectly (e.g., via one or more buses).

Receiver 710 may receive information such as packets, user data, or control information associated with various information channels (e.g., control channels, data channels, information related to decoupled transmissions of channel quality feedback and ACK/NACK feedback, etc.). Information may be passed on to other components of the wireless device 705. The receiver 710 may be an example of aspects of the transceiver 940 described with reference to FIG. 9. The receiver 710 may include or be associated with a single antenna, or may include or be associated with a set of antennas.

Wireless communication manager 715 may be an example of aspects of the wireless communication manager 915 described with reference to FIG. 9. Wireless communication manager 715 may include a control information processor 725, a channel quality feedback manager 730, and an ACK/NACK feedback manager 735.

The control information processor 725 may receive a downlink grant for a downlink transmission (e.g., a PUSCH transmission). In some examples, the downlink grant may be received in DCI. In some examples, the control information processor 725 may also receive other DCI or other control information (e.g., control information received in RRC signaling).

The channel quality feedback manager 730 may transmit channel quality feedback at a first time triggered by receipt of the downlink grant by the control information processor 725. The first time may occur during a first TTI. In some examples, the channel quality feedback may include a SNIR (e.g., a decoding SNIR). In some examples, the channel quality feedback may be transmitted on a PUCCH.

The ACK/NACK feedback manager 735 may transmit ACK/NACK feedback for the downlink transmission at a second time triggered by receipt of the downlink grant. The second time may occur during a second TTI. The second TTI may occur later in time than the first TTI. In some examples, the ACK/NACK feedback may include one or both of an ACK or a NACK. In some examples, the ACK/NACK feedback may include a combination of ACKs and/or NACKs. In some examples, the first TTI may include a first subframe, and the second TTI may include a second subframe. In some examples, the first TTI may occur two TTIs after a TTI in which the downlink grant is received by the control information processor 725, and the second TTI may occur four TTIs after the TTI in which the downlink grant is received. In some examples, the first TTI may occur two TTIs after a TTI in which the downlink grant is received by the control information processor 725, and the second TTI may occur three TTIs after the TTI in which the downlink grant is received.

Transmitter 720 may transmit signals generated by other components of the wireless device 705 (e.g., channel quality feedback or ACK/NACK feedback). In some examples, the transmitter 720 may be collocated with a receiver 710 in a transceiver. For example, the transmitter 720 may be an example of aspects of the transceiver 940 described with reference to FIG. 9. The transmitter 720 may include or be associated with a single antenna, or may include or be associated with a set of antennas, and in some examples may share one or more antennas with the receiver 710.

Figure 8:
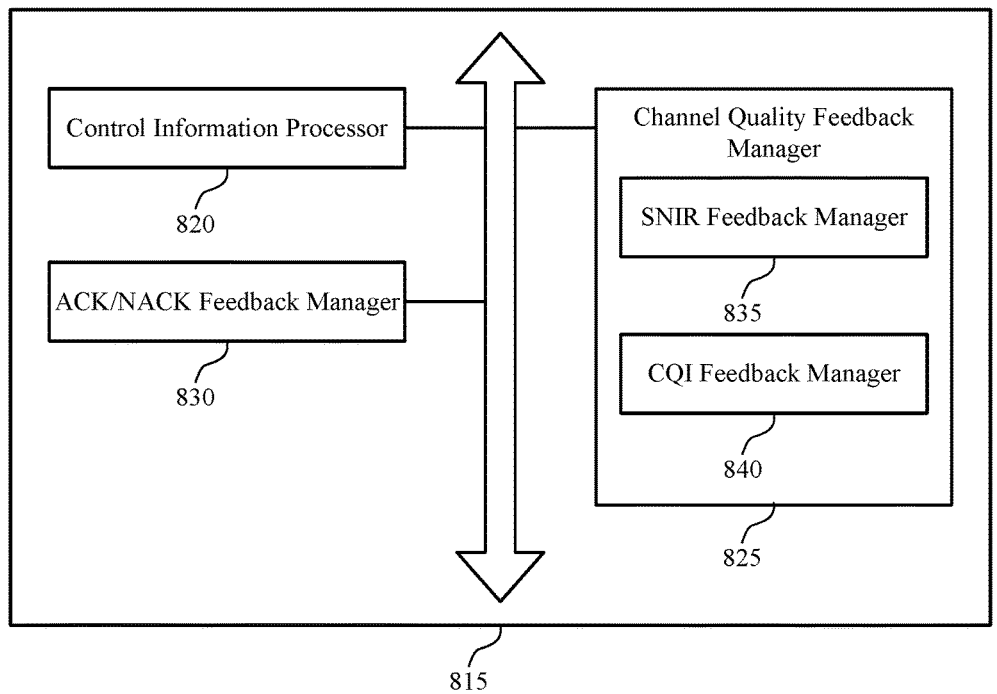

FIG. 8 shows a diagram 800 of a wireless communication manager 815 that supports decoupled transmissions of channel quality feedback and ACK/NACK feedback in accordance with various aspects of the present disclosure. The wireless communication manager 815 may be an example of aspects of a wireless communication manager 615, a wireless communication manager 715, or a wireless communication manager 915 described with reference to FIGS. 6, 7, and 9. The wireless communication manager 815 may include a control information processor 820, a channel quality feedback manager 825, and an ACK/NACK feedback manager 830. The channel quality feedback manager 825 may include a SNIR feedback manager 835 and an optional CQI feedback manager 840. Each of these components may be in communication with one another directly or indirectly (e.g., via one or more buses).

The control information processor 820 may receive a downlink grant for a downlink transmission (e.g., a PUSCH transmission). In some examples, the downlink grant may be received in DCI. In some examples, the control information processor 820 may also receive other DCI or other control information (e.g., control information received in RRC signaling).

In some examples, the control information processor 820 may receive an indicator that decoupled reporting of channel quality feedback and ACK/NACK feedback is triggered. In some examples, the indicator that decoupled reporting of channel quality feedback and ACK/NACK feedback is triggered may be received in DCI or RRC signaling. In some examples, the indicator that decoupled reporting of channel quality feedback and ACK/NACK feedback is triggered may be received in DCI received in a same TTI as the downlink grant. In some examples, the indicator that decoupled reporting of channel quality feedback and ACK/NACK feedback is triggered may be received in RRC signaling received prior to the TTI in which the downlink grant is received (e.g., similarly to, or as a part of, SPS information). When the indicator that decoupled reporting of channel quality feedback and ACK/NACK feedback is triggered is provided in RRC signaling, the indicator may trigger decoupled reporting of channel quality feedback and ACK/NACK feedback every time a downlink grant (or DCI) is received. Providing the indicator that decoupled reporting of channel quality feedback and ACK/NACK feedback is triggered in RRC signaling may also help reduce the size of DCI.

In some examples, the control information processor 820 may receive an indicator that CQI reporting during a first TTI is scheduled. In some examples, the indicator that CQI reporting during the first TTI is scheduled may include one or both of: a first indicator that ACK/NACK feedback during the first TTI is scheduled, or a second indicator that a PUSCH transmission during the first TTI is scheduled. In some examples, the indicator may include a downlink grant.

In some examples, the control information processor 820 may receive a first uplink grant scheduling the channel quality feedback. In some examples, the first uplink grant may be received in DCI or RRC signaling. In some examples, receipt of the first uplink grant may be the indicator that decoupled reporting of channel quality feedback and ACK/NACK feedback is triggered. In some examples, the control information processor 820 may additionally or alternatively receive a second uplink grant scheduling the ACK/NACK feedback. In some examples, the second uplink grant may be received in DCI, such as DCI received in a same TTI as the downlink grant.

The channel quality feedback manager 825 may transmit channel quality feedback. For example, the SNIR feedback manager 835 may transmit channel quality feedback including a SNIR (e.g., a decoding SNIR) at a first time triggered by receipt of the downlink grant by the control information processor 820. The first time may occur during the first TTI. In some examples, the channel quality feedback may be transmitted on a PUCCH. In some examples, the SNIR feedback manager 835 may generate the SNIR when the wireless communication manager 815 generates a channel estimate used to decode the downlink transmission associated with the downlink grant, or prior to finishing the decode of the downlink transmission, or based on a set of frequencies on which the downlink transmission is scheduled in the downlink grant.

The CQI feedback manager 840 may transmit CQI feedback. In some examples, the CQI feedback manager 840 may transmit CQI feedback during the first TTI when the control information processor 820 receives the indicator that CQI reporting during the first TTI is scheduled, regardless of whether a SNIR is transmitted during the first TTI. In these examples, the CQI feedback may be transmitted along with a SNIR (e.g., when a SNIR is also transmitted during the first TTI). Alternatively, CQI feedback may be given priority and transmitted instead of channel quality feedback such as a SNIR. In other examples, the CQI feedback manager 840 may refrain from transmitting CQI feedback during the first TTI when the control information processor 820 receives the indicator that CQI reporting during the first TTI is scheduled. For example, the CQI feedback manager 840 may be configured to refrain from transmitting CQI feedback when a SNIR is transmitted during the first TTI. When the control information processor 820 does not receive the indicator that CQI reporting during the first TTI is scheduled, the CQI feedback manager 840 may refrain from transmitting CQI feedback during the first TTI.

The ACK/NACK feedback manager 830 may transmit ACK/NACK feedback for the downlink transmission at a second time triggered by receipt of the downlink grant. The second time may occur during a second TTI. The second TTI may occur later in time than the first TTI. In some examples, the ACK/NACK feedback may include one or both of an ACK or a NACK. In some examples, the ACK/NACK feedback may include a combination of ACKs and/or NACKs. In some examples, the first TTI may include a first subframe, and the second TTI may include a second subframe. In some examples, the first TTI may occur two TTIs after a TTI in which the downlink grant is received by the control information processor 820, and the second TTI may occur four TTIs after the TTI in which the downlink grant is received. In some examples, the first TTI may occur two TTIs after a TTI in which the downlink grant is received by the control information processor 820, and the second TTI may occur three TTIs after the TTI in which the downlink grant is received.

Figure 9:
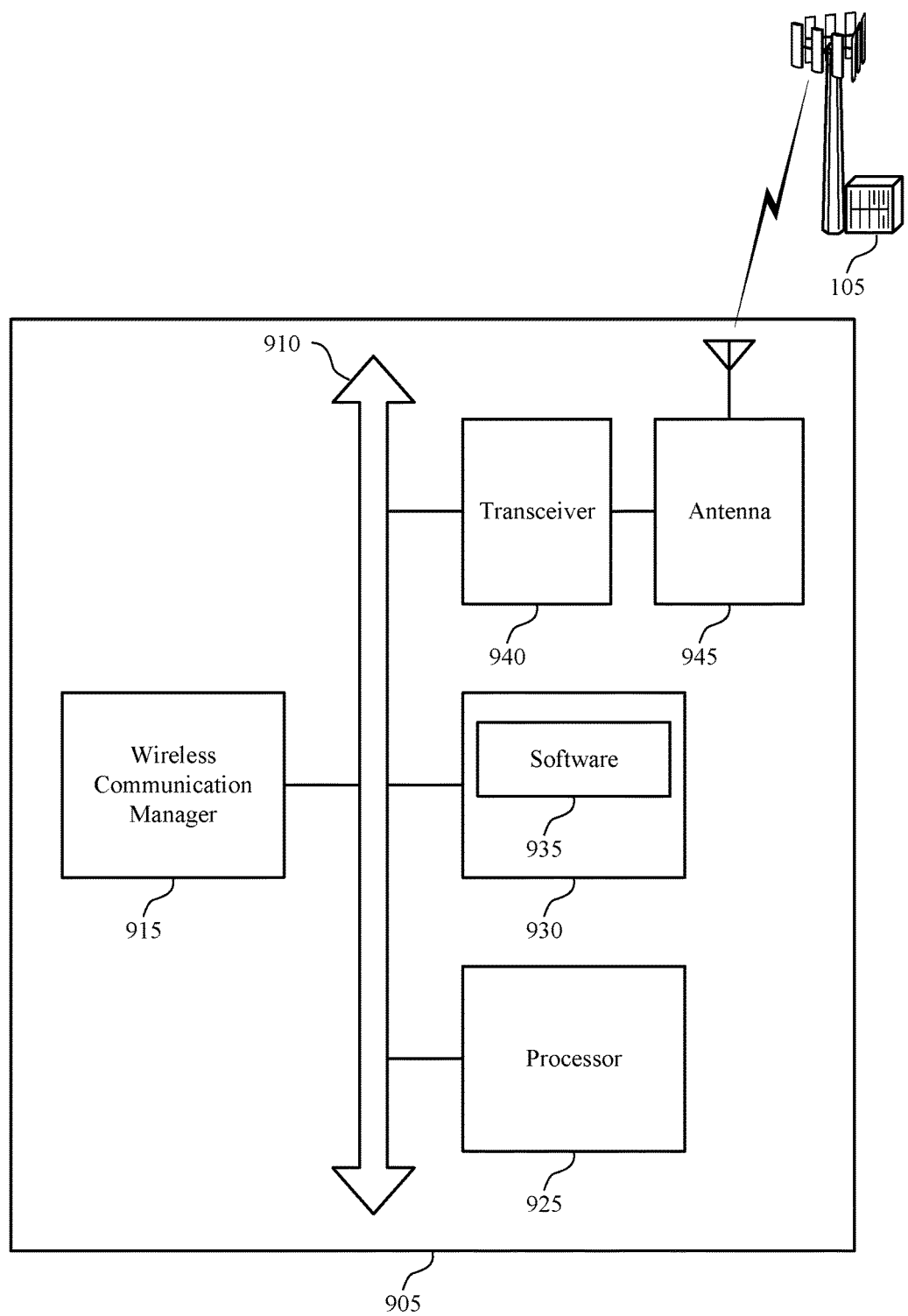
FIG. 9 illustrates a diagram of a system including a UE that supports decoupled transmissions of channel quality feedback and ACK/NACK feedback in accordance with various aspects of the present disclosure.

FIG. 9 shows a diagram of a system 900 including a device 905 that supports decoupled transmissions of channel quality feedback and ACK/NACK feedback in accordance with various aspects of the present disclosure. Device 905 may be an example of or include the components of wireless device 605, wireless device 705, or a UE 115 as described above, e.g., with reference to FIGS. 1, 7 and 8.

Device 905 may include components for bi-directional voice and/or data communication, including components for transmitting and receiving communications, including wireless communication manager 915, processor 925, memory 930, code 935 (e.g., software or firmware), transceiver 940, and antenna 945.

Processor 925 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 925 may be configured to operate a memory array using a memory controller. In other cases, a memory controller may be integrated into processor 925. Processor 925 may be configured to execute computer-readable instructions stored in a memory to perform various functions (e.g., function or tasks supporting decoupled transmissions of channel quality feedback and ACK/NACK feedback).

Memory 930 may include random access memory (RAM) or read only memory (ROM). The memory 930 may store computer-readable, computer-executable code 935 including instructions that, when executed, cause the processor to perform various functions described herein. In some cases, the memory 930 may contain, among other things, a Basic Input-Output system (BIOS) which may control basic hardware and/or software operation such as the interaction with peripheral components or devices.

Code 935 may include code to implement aspects of the present disclosure, including code to support decoupled transmissions of channel quality feedback and ACK/NACK feedback. Code 935 can be stored in a non-transitory computer-readable medium such as system memory or other memory. In some cases, the code 935 may not be directly executable by the processor but may cause a computer (e.g., when compiled and executed) to perform functions described herein.

Transceiver 940 may communicate bi-directionally, via one or more antennas, wired, or wireless links as described above. For example, the transceiver 940 may represent a wireless transceiver and may communicate bi-directionally with another wireless transceiver. The transceiver 940 may also include a modem to modulate the packets and provide the modulated packets to the antennas for transmission, and to demodulate packets received from the antennas.

In some cases, the wireless device may include a single antenna 945. However, in some cases the device may have more than one antenna 945, which may be capable of concurrently transmitting or receiving multiple wireless transmissions.

Figure 10:
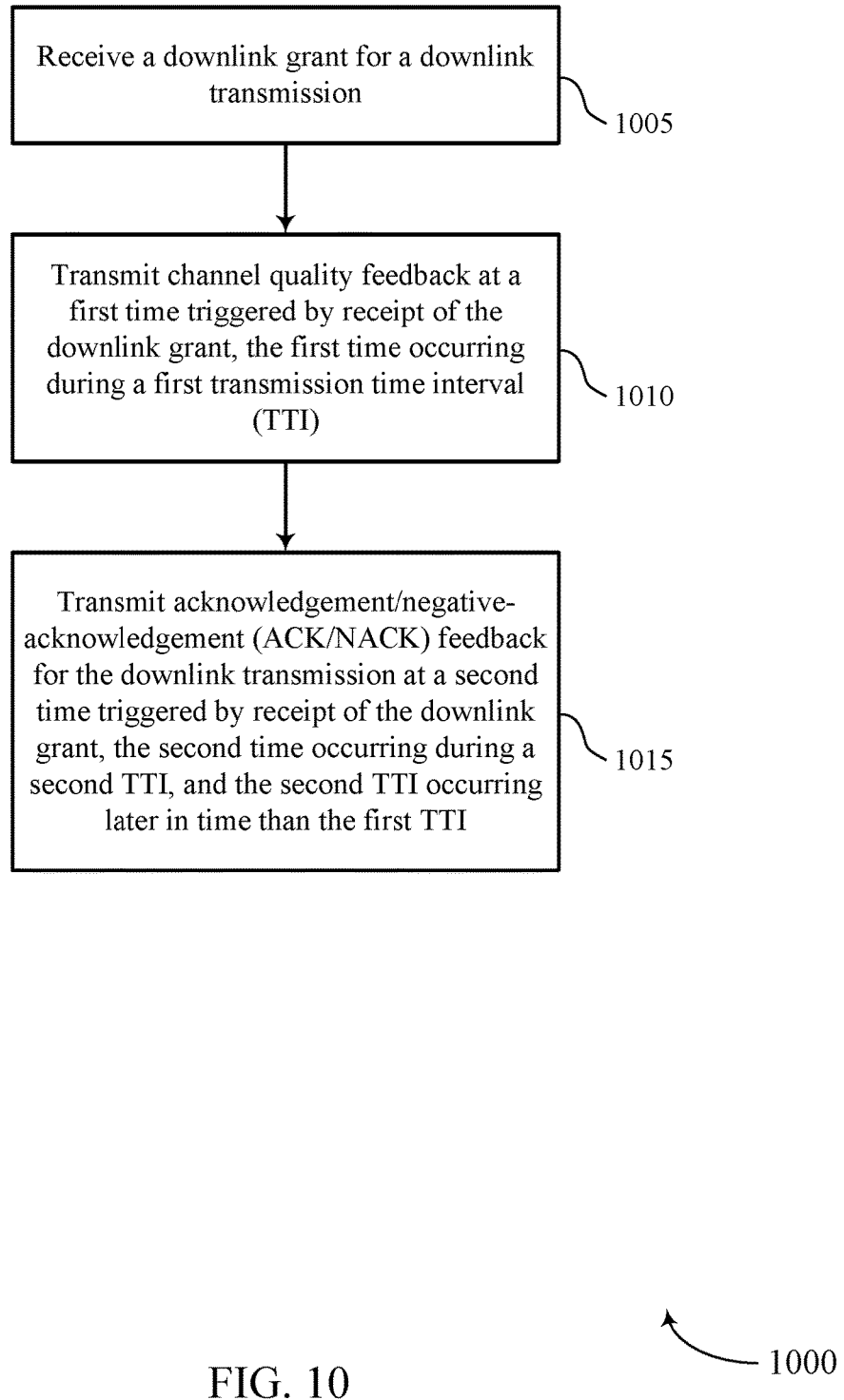
FIGS. 10 through 13 illustrate methods for decoupled transmissions of channel quality feedback and ACK/NACK feedback in accordance with various aspects of the present disclosure.

FIG. 10 shows a flowchart illustrating a method 1000 for decoupled transmissions of channel quality feedback and ACK/NACK feedback in accordance with various aspects of the present disclosure. The operations of method 1000 may be implemented by a UE 115 or its components as described herein. For example, the operations of method 1000 may be performed by a wireless communication manager as described with reference to FIGS. 6 through 9. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may receive a downlink grant for a downlink transmission (e.g., a PUSCH transmission). In some examples, the downlink grant may be received in DCI. The operations of block 1005 may be performed according to the methods described with reference to FIGS. 1 through 4. In some examples, aspects of the operations of block 1005 may be performed by a control information processor as described with reference to FIGS. 7 and 8.

At block 1010, the UE 115 may transmit channel quality feedback at a first time triggered by receipt of the downlink grant. The first time may occur during a first TTI. In some examples, the channel quality feedback may include a SNIR (e.g., a decoding SNIR). In some examples, the channel quality feedback may be transmitted on a PUCCH. The operations of block 1010 may be performed according to the methods described with reference to FIGS. 1 through 4. In some examples, aspects of the operations of block 1010 may be performed by a channel quality feedback manager as described with reference to FIGS. 7 and 8.

At block 1015, the UE 115 may transmit ACK/NACK feedback for the downlink transmission at a second time triggered by receipt of the downlink grant. The second time may occur during a second TTI, and the second TTI may occur later in time than the first TTI. In some examples, the ACK/NACK feedback may include one or both of an ACK or a NACK. In some examples, the ACK/NACK feedback may include a combination of ACKs and/or NACKs. The operations of block 1015 may be performed according to the methods described with reference to FIGS. 1 through 4. In some examples, aspects of the operations of block 1015 may be performed by a ACK/NACK feedback manager as described with reference to FIGS. 7 and 8.

In some examples of the method 1000, the first TTI may include a first subframe, and the second TTI may include a second subframe. In some examples, the first TTI may occur two TTIs after a TTI in which the downlink grant is received at block 1005, and the second TTI may occur four TTIs after the TTI in which the downlink grant is received. In some examples, the first TTI may occur two TTIs after a TTI in which the downlink grant is received at block 1005, and the second TTI may occur three TTIs after the TTI in which the downlink grant is received.

Figure 11:
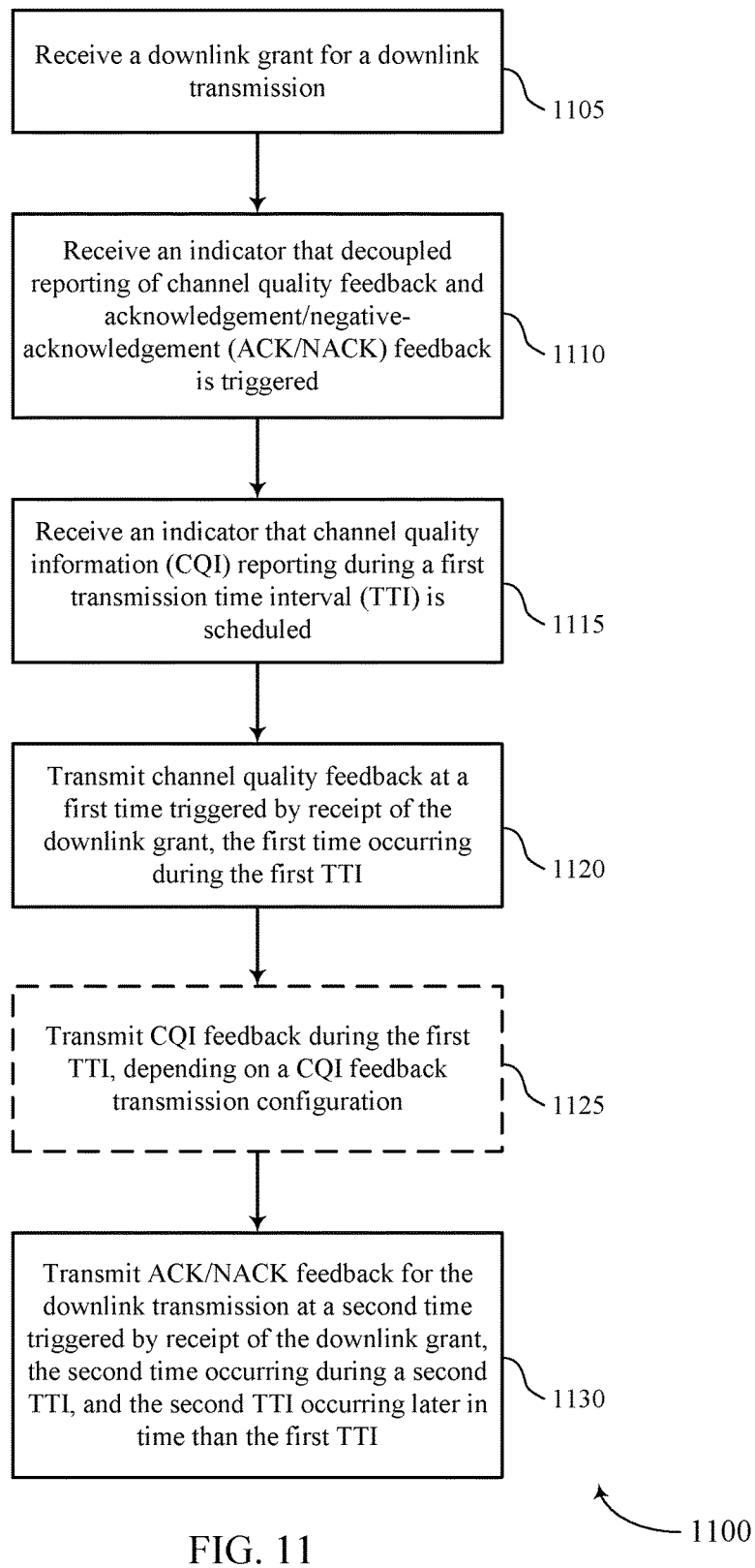

FIG. 11 shows a flowchart illustrating a method 1100 for decoupled transmissions of channel quality feedback and ACK/NACK feedback in accordance with various aspects of the present disclosure. The operations of method 1100 may be implemented by a UE 115 or its components as described herein. For example, the operations of method 1100 may be performed by a wireless communication manager as described with reference to FIGS. 6 through 9. In some examples, a UE 115 may execute a set of codes to control the functional elements of the UE 115 to perform the functions described below. Additionally or alternatively, the UE 115 may perform aspects the functions described below using special-purpose hardware.

At block 1105, the UE 115 may receive a downlink grant for a downlink transmission (e.g., a PUSCH transmission). In some examples, the downlink grant may be received in DCI. The operations of block 1105 may be performed according to the methods described with reference to FIGS. 1 through 4. In some examples, aspects of the operations of block 1105 may be performed by a control information processor as described with reference to FIGS. 7 and 8.

At block 1110, the UE 115 may receive an indicator that decoupled reporting of channel quality feedback and ACK/NACK feedback is triggered. In some examples, the indicator that decoupled reporting of channel quality feedback and ACK/NACK feedback is triggered may be received in DCI or RRC signaling. In some examples, the indicator that decoupled reporting of channel quality feedback and ACK/NACK feedback is triggered may be received in DCI received in a same TTI as the downlink grant received at block 1105. In some examples, the indicator that decoupled reporting of channel quality feedback and ACK/NACK feedback is triggered may be received in RRC signaling received prior to the TTI in which the downlink grant is received (e.g., similarly to, or as a part of, SPS information). When the indicator that decoupled reporting of channel quality feedback and ACK/NACK feedback is triggered is provided in RRC signaling, the indicator may trigger decoupled reporting of channel quality feedback and ACK/NACK feedback every time a downlink grant (or DCI) is received. Providing the indicator that decoupled reporting of channel quality feedback and ACK/NACK feedback is triggered in RRC signaling may also help reduce the size of DCI. The operations of block 1110 may be performed according to the methods described with reference to FIGS. 1 through 4. In some examples, aspects of the operations of block 1110 may be performed by a control information processor as described with reference to FIG. 8.

At block 1115, the UE 115 may receive an indicator that CQI reporting during the first TTI is scheduled. In some examples, the indicator that CQI reporting during the first TTI is scheduled may include one or both of: a first indicator that ACK/NACK feedback during the first TTI is scheduled, or a second indicator that a PUSCH transmission during the first TTI is scheduled. In some examples, the indicator may include a downlink grant. The operations of block 1115 may be performed according to the methods described with reference to FIGS. 1 through 4. In some examples, aspects of the operations of block 1115 may be performed by a control information processor as described with reference to FIGS. 7 and 8.

At block 1120, the UE 115 may transmit channel quality feedback at a first time triggered by receipt of the downlink grant. The first time may occur during a first TTI. In some examples, the channel quality feedback may include a SNIR (e.g., a decoding SNIR). In some examples, the channel quality feedback may be transmitted on a PUCCH. The operations of block 1120 may be performed according to the methods described with reference to FIGS. 1 through 4. In some examples, aspects of the operations of block 1120 may be performed by a channel quality feedback manager as described with reference to FIGS. 7 and 8.

At block 1125, the UE 115 may optionally transmit CQI feedback during the first TTI, depending on a CQI feedback transmission configuration of the UE 115. When the UE 115 is configured to transmit CQI feedback in a same TTI as channel quality feedback such as a SNIR, the UE 115 may transmit CQI feedback at block 1125. Alternatively, CQI feedback may be given priority and transmitted instead of channel quality feedback such as a SNIR. When the UE 115 is configured to transmit just one of CQI feedback or channel quality feedback such as a SNIR during a TTI, the UE 115 may refrain from transmitting CQI feedback at block 1125. The operations of block 1125 may be performed according to the methods described with reference to FIGS. 1 through 4. In some examples, aspects of the operations of block 1125 may be performed by a CQI feedback manager as described with reference to FIG. 8.

At block 1130, the UE 115 may transmit ACK/NACK feedback for the downlink transmission at a second time triggered by receipt of the downlink grant. The second time may occur during a second TTI, and the second TTI may occur later in time than the first TTI. In some examples, the ACK/NACK feedback may include one or both of an ACK or a NACK. In some examples, the ACK/NACK feedback may include a combination of ACKs and/or NACKs. The operations of block 1130 may be performed according to the methods described with reference to FIGS. 1 through 4. In some examples, aspects of the operations of block 1130 may be performed by a ACK/NACK feedback manager as described with reference to FIGS. 7 and 8.

In some examples of the method 1100, the first TTI may include a first subframe, and the second TTI may include a second subframe. In some examples, the first TTI may occur two TTIs after a TTI in which the downlink grant is received at block 1105, and the second TTI may occur four TTIs after the TTI in which the downlink grant is received. In some examples, the first TTI may occur two TTIs after a TTI in which the downlink grant is received at block 1105, and the second TTI may occur three TTIs after the TTI in which the downlink grant is received.

Figure 12:
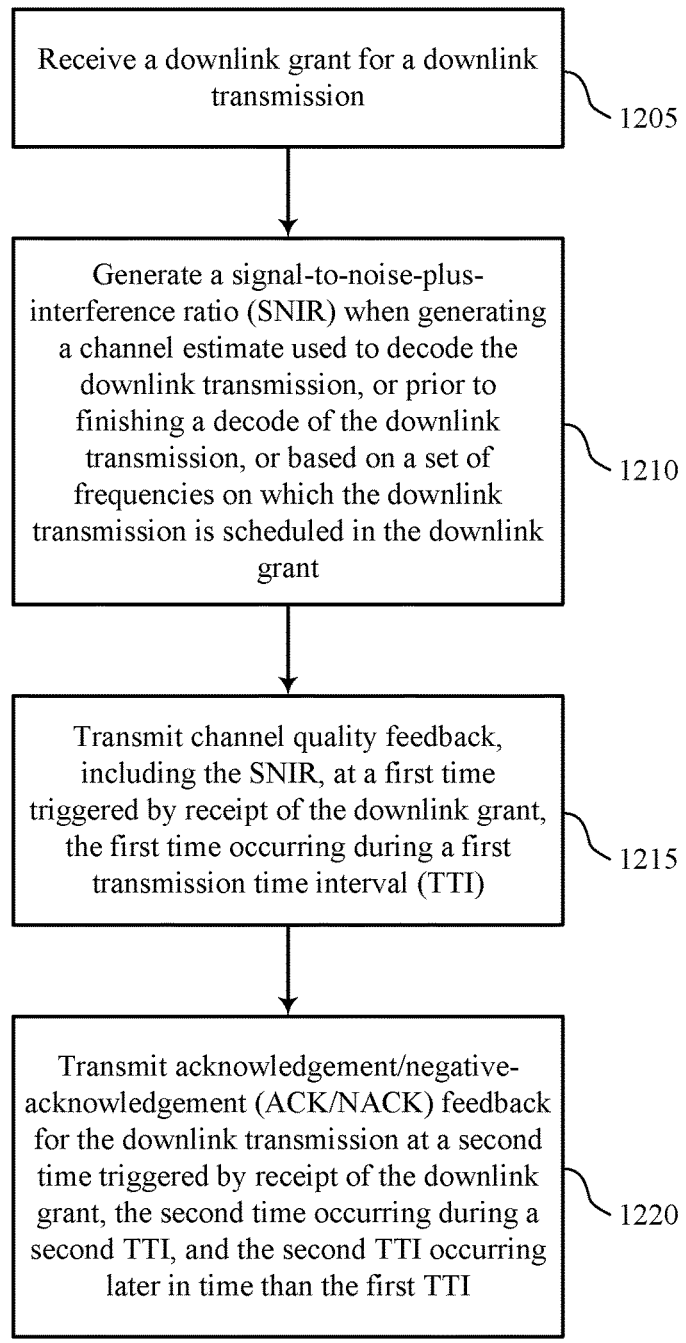

FIG. 12 shows a flowchart illustrating a method 1200 for decoupled transmissions of channel quality feedback and ACK/NACK feedback in accordance with various aspects of the present disclosure. The operations of method 1200 may be implemented by a UE 115 or its components as described herein. For example, the operations of method 1200 may be performed by a wireless communication manager as described with reference to FIGS. 6 through 9. In some examples, a UE 115 may execute a set of codes to control the functional elements of the UE 115 to perform the functions described below. Additionally or alternatively, the UE 115 may perform aspects the functions described below using special-purpose hardware.

At block 1205, the UE 115 may receive a downlink grant for a downlink transmission (e.g., a PUSCH transmission). In some examples, the downlink grant may be received in DCI. The operations of block 1205 may be performed according to the methods described with reference to FIGS. 1 through 4. In some examples, aspects of the operations of block 1205 may be performed by a control information processor as described with reference to FIGS. 7 and 8.

At block 1210, the UE 115 may generate a SNIR when generating a channel estimate used to decode the downlink transmission, or prior to finishing the decode of the downlink transmission, or based on a set of frequencies on which the downlink transmission is scheduled in the downlink grant. In some examples, SNIR may include a decoding SNIR. The operations of block 1210 may be performed according to the methods described with reference to FIGS. 1 through 4. In some examples, aspects of the operations of block 1210 may be performed by a SNIR feedback manager as described with reference to FIG. 8.

At block 1215, the UE 115 may transmit channel quality feedback (e.g., the SNIR) at a first time triggered by receipt of the downlink grant. The first time may occur during a first TTI. In some examples, the channel quality feedback may be transmitted on a PUCCH. The operations of block 1215 may be performed according to the methods described with reference to FIGS. 1 through 4. In some examples, aspects of the operations of block 1215 may be performed by a channel quality feedback manager as described with reference to FIGS. 7 and 8.

At block 1220, the UE 115 may transmit ACK/NACK feedback for the downlink transmission at a second time triggered by receipt of the downlink grant. The second time may occur during a second TTI, and the second TTI may occur later in time than the first TTI. In some examples, the ACK/NACK feedback may include one or both of an ACK or a NACK. In some examples, the ACK/NACK feedback may include a combination of ACKs and/or NACKs. The operations of block 1220 may be performed according to the methods described with reference to FIGS. 1 through 4. In some examples, aspects of the operations of block 1220 may be performed by a ACK/NACK feedback manager as described with reference to FIGS. 7 and 8.

In some examples of the method 1200, the first TTI may include a first subframe, and the second TTI may include a second subframe. In some examples, the first TTI may occur two TTIs after a TTI in which the downlink grant is received at block 1205, and the second TTI may occur four TTIs after the TTI in which the downlink grant is received. In some examples, the first TTI may occur two TTIs after a TTI in which the downlink grant is received at block 1205, and the second TTI may occur three TTIs after the TTI in which the downlink grant is received.

Figure 13:
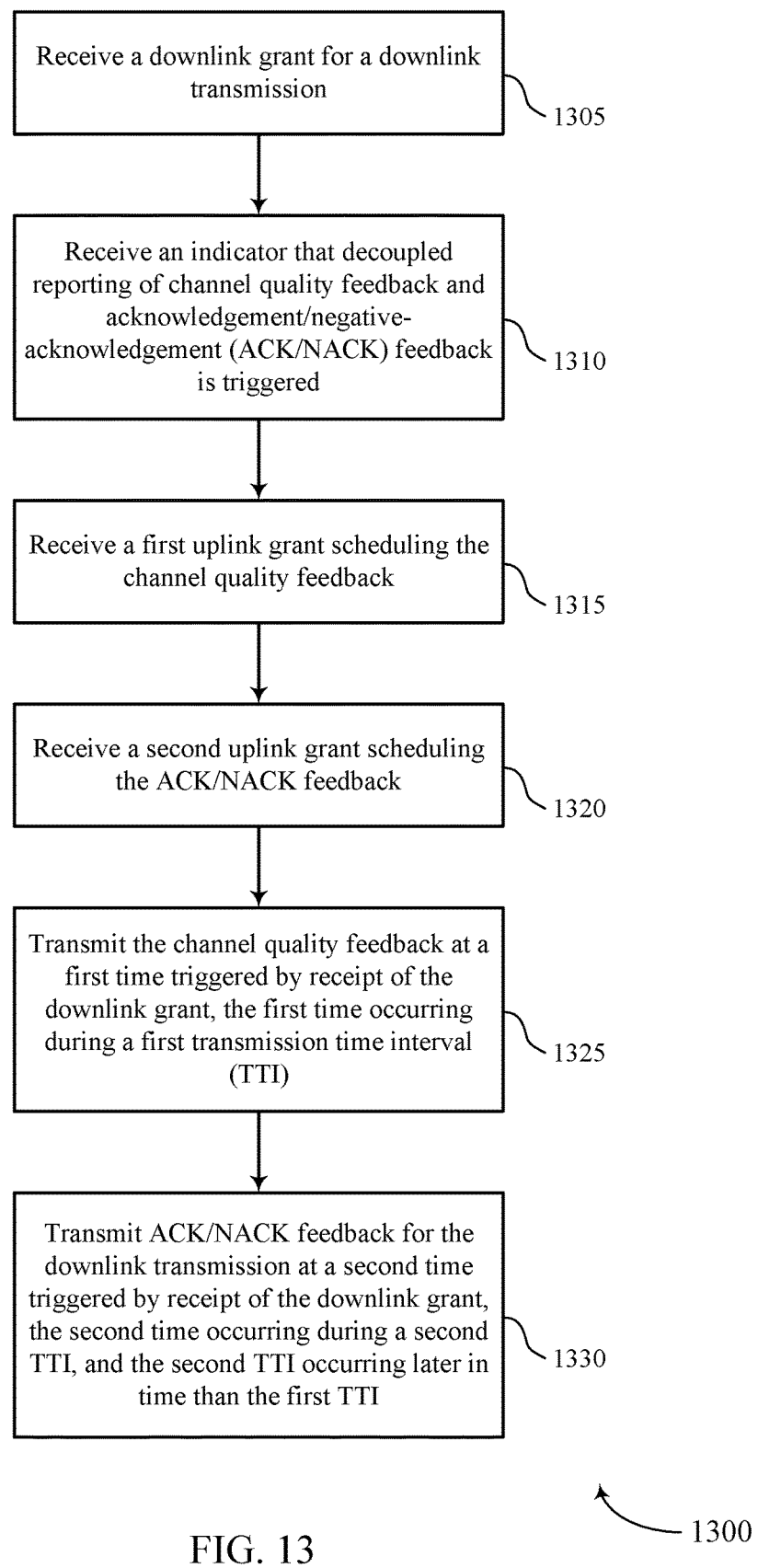

FIG. 13 shows a flowchart illustrating a method 1300 for decoupled transmissions of channel quality feedback and ACK/NACK feedback in accordance with various aspects of the present disclosure. The operations of method 1300 may be implemented by a UE 115 or its components as described herein. For example, the operations of method 1300 may be performed by a wireless communication manager as described with reference to FIGS. 6 through 9. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may receive a downlink grant for a downlink transmission (e.g., a PUSCH transmission). In some examples, the downlink grant may be received in DCI. The operations of block 1305 may be performed according to the methods described with reference to FIGS. 1 through 4. In some examples, aspects of the operations of block 1305 may be performed by a control information processor as described with reference to FIGS. 7 and 8.

At block 1310, the UE 115 may receive an indicator that decoupled reporting of channel quality feedback and ACK/NACK feedback is triggered. In some examples, the indicator that decoupled reporting of channel quality feedback and ACK/NACK feedback is triggered may be received in DCI or RRC signaling. In some examples, the indicator that decoupled reporting of channel quality feedback and ACK/NACK feedback is triggered may be received in DCI received in a same TTI as the downlink grant received at block 1305. In some examples, the indicator that decoupled reporting of channel quality feedback and ACK/NACK feedback is triggered may be received in RRC signaling received prior to the TTI in which the downlink grant is received (e.g., similarly to, or as a part of, SPS information). When the indicator that decoupled reporting of channel quality feedback and ACK/NACK feedback is triggered is provided in RRC signaling, the indicator may trigger decoupled reporting of channel quality feedback and ACK/NACK feedback every time a downlink grant (or DCI) is received. Providing the indicator that decoupled reporting of channel quality feedback and ACK/NACK feedback is triggered in RRC signaling may also help reduce the size of DCI. The operations of block 1310 may be performed according to the methods described with reference to FIGS. 1 through 4. In some examples, aspects of the operations of block 1310 may be performed by a control information processor as described with reference to FIG. 8.

At block 1315, the UE 115 may receive a first uplink grant scheduling the channel quality feedback. In some examples, the first uplink grant may be received in DCI or RRC signaling. In some examples, receipt of the first uplink grant may be the indicator that decoupled reporting of channel quality feedback and ACK/NACK feedback is triggered (e.g., the operations of blocks 1310 and 1315 may be combined). The operations of block 1315 may be performed according to the methods described with reference to FIGS. 1 through 4. In some examples, aspects of the operations of block 1315 may be performed by a control information processor as described with reference to FIG. 8.

At block 1320, the UE 115 may receive a second uplink grant scheduling the ACK/NACK feedback. In some examples, the second uplink grant may be received in DCI, such as DCI received in a same TTI as the downlink grant received at block 1305. The operations of block 1320 may be performed according to the methods described with reference to FIGS. 1 through 4. In some examples, aspects of the operations of block 1320 may be performed by a control information processor as described with reference to FIG. 8.

At block 1325, the UE 115 may transmit channel quality feedback at a first time triggered by receipt of the downlink grant (e.g., as scheduled by the first uplink grant). The first time may occur during a first TTI. In some examples, the channel quality feedback may include a SNIR (e.g., a decoding SNIR). In some examples, the channel quality feedback may be transmitted on a PUCCH. The operations of block 1325 may be performed according to the methods described with reference to FIGS. 1 through 4. In some examples, aspects of the operations of block 1325 may be performed by a channel quality feedback manager as described with reference to FIGS. 7 and 8.

At block 1330, the UE 115 may transmit ACK/NACK feedback for the downlink transmission at a second time triggered by receipt of the downlink grant (e.g., as scheduled by the second uplink grant). The second time may occur during a second TTI, and the second TTI may occur later in time than the first TTI. In some examples, the ACK/NACK feedback may include one or both of an ACK or a NACK. In some examples, the ACK/NACK feedback may include a combination of ACKs and/or NACKs. The operations of block 1330 may be performed according to the methods described with reference to FIGS. 1 through 4. In some examples, aspects of the operations of block 1330 may be performed by a ACK/NACK feedback manager as described with reference to FIGS. 7 and 8.

In some examples of the method 1300, the first TTI may include a first subframe, and the second TTI may include a second subframe. In some examples, the first TTI may occur two TTIs after a TTI in which the downlink grant is received at block 1305, and the second TTI may occur four TTIs after the TTI in which the downlink grant is received. In some examples, the first TTI may occur two TTIs after a TTI in which the downlink grant is received at block 1305, and the second TTI may occur three TTIs after the TTI in which the downlink grant is received.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication system (UMTS). 3GPP LTE and LTE-Advanced (LTE-A) are new releases of Universal Mobile Telecommunications System (UMTS) that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE system may be described for purposes of example, and LTE terminology may be used in much of the description, the techniques described herein are applicable beyond LTE applications, including in 5G or NR applications, among others.

In LTE/LTE-A networks, including such networks described herein, the term eNB may for example be used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up portions of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two three, four, and the like) cells (e.g., component carriers). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, communication links of the wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Additionally or alternatively, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a downlink grant for a downlink transmission;
   transmitting channel quality feedback at a first time triggered by receipt of the downlink grant, the first time occurring during a first transmission time interval (TTI), wherein the first TTI occurs two TTIs after a TTI in which the downlink grant is received; and
   transmitting acknowledgement/negative-acknowledgement (ACK/NACK) feedback for the downlink transmission at a second time triggered by receipt of the downlink grant, the second time occurring during a second TTI, and the second TTI occurring later in time than the first TTI.

2. The method of claim 1, wherein the channel quality feedback comprises a signal-to-noise-plus-interference ratio (SNIR).

3. The method of claim 2, further comprising:
   determining whether an indicator that channel quality information (CQI) reporting during the first TTI is scheduled is received.

4. The method of claim 3, further comprising:
   refraining from transmitting CQI feedback during the first TTI.

5. The method of claim 3, further comprising:
   transmitting CQI feedback during the first TTI.

6. The method of claim 3, wherein the indicator that CQI reporting during the first TTI is scheduled comprises one or both of:
   a first indicator that ACK/NACK feedback during the first TTI is scheduled, or a second indicator that a physical uplink shared channel (PUSCH) transmission during the first TTI is scheduled.

7. The method of claim 2, further comprising:
   generating the SNIR when generating a channel estimate used to decode the downlink transmission, or prior to finishing the decode of the downlink transmission.

8. The method of claim 2, further comprising:
   generating the SNIR based at least in part on a set of frequencies on which the downlink transmission is scheduled in the downlink grant.

9. The method of claim 2, wherein the SNIR comprises a decoding SNIR.

10. The method of claim 1, further comprising:
    receiving a first uplink grant scheduling the channel quality feedback; and
    receiving a second uplink grant scheduling the ACK/NACK feedback.

11. The method of claim 10, wherein the first uplink grant is received in downlink control information (DCI) or radio resource control (RRC) signaling.

12. The method of claim 1, further comprising:
    receiving, in downlink control information (DCI) or radio resource control (RRC) signaling, an indicator that decoupled reporting of channel quality feedback and ACK/NACK feedback is triggered.

13. The method of claim 1, wherein the ACK/NACK feedback comprises one or both of:
    an ACK or a NACK.

14. The method of claim 1, wherein the first TTI comprises a first subframe, and the second TTI comprises a second subframe.

15. The method of claim 1, wherein the second TTI occurs four TTIs after the TTI in which the downlink grant is received.

16. The method of claim 1, wherein the second TTI occurs three TTIs after the TTI in which the downlink grant is received.

17. An apparatus for wireless communication, in a system comprising:
    a processor;
    memory in electronic communication with the processor; and
    instructions stored in the memory and operable, when executed by the processor, to cause the apparatus to:
    receive a downlink grant for a downlink transmission;
    transmit channel quality feedback at a first time triggered by receipt of the downlink grant, the first time occurring during a first transmission time interval (TTI), wherein the first TTI occurs two TTIs after a TTI in which the downlink grant is received; and
    transmit acknowledgement/negative-acknowledgement (ACK/NACK) feedback for the downlink transmission at a second time triggered by receipt of the downlink grant, the second time occurring during a second TTI, and the second TTI occurring later in time than the first TTI.

18. The apparatus of claim 17, wherein the channel quality feedback comprises a signal-to-noise-plus-interference ratio (SNIR).

19. The apparatus of claim 18, wherein the instructions are further executable by the processor to cause the apparatus to:
    determine whether an indicator that channel quality information (CQI) reporting during the first TTI is scheduled is received.

20. The apparatus of claim 19, wherein the instructions are further executable by the processor to cause the apparatus to:
    refrain from transmitting CQI feedback during the first TTI.

21. The apparatus of claim 19, wherein the instructions are further executable by the processor to cause the apparatus to:
   transmit CQI feedback during the first TTI.

22. The apparatus of claim 19, wherein the indicator that CQI reporting during the first TTI is scheduled comprises one or both of:
   a first indicator that ACK/NACK feedback during the first TTI is scheduled, or a second indicator that a physical uplink shared channel (PUSCH) transmission during the first TTI is scheduled.

23. The apparatus of claim 18, wherein the instructions are further executable by the processor to cause the apparatus to:
   generate the SNIR when generating a channel estimate used to decode the downlink transmission, or prior to finishing the decode of the downlink transmission.

24. The apparatus of claim 18, wherein the instructions are further executable by the processor to cause the apparatus to:
   generate the SNIR based at least in part on a set of frequencies on which the downlink transmission is scheduled in the downlink grant.

25. The apparatus of claim 18, wherein the SNIR comprises a decoding SNIR.

26. An apparatus for wireless communication, comprising:
   means for receiving a downlink grant for a downlink transmission;
   means for transmitting channel quality feedback at a first time triggered by receipt of the downlink grant, the first time occurring during a first transmission time interval (TTI), wherein the first TTI occurs two TTIs after a TTI in which the downlink grant is received; and
   means for transmitting acknowledgement/negative-acknowledgement (ACK/NACK) feedback for the downlink transmission at a second time triggered by receipt of the downlink grant, the second time occurring during a second TTI, and the second TTI occurring later in time than the first TTI.

27. The apparatus of claim 26, wherein the channel quality feedback comprises a signal-to-noise-plus-interference ratio (SNIR).

28. The apparatus of claim 27, further comprising:
   means for determining whether an indicator that channel quality information (CQI) reporting during the first TTI is scheduled is received.

29. The apparatus of claim 28, further comprising:
   means for refraining from transmitting CQI feedback during the first TTI.

30. A non-transitory computer readable medium storing code for wireless communication, the code comprising instructions executable by a processor to:
   receive a downlink grant for a downlink transmission;
   transmit channel quality feedback at a first time triggered by receipt of the downlink grant, the first time occurring during a first transmission time interval (TTI), wherein the first TTI occurs two TTIs after a TTI in which the downlink grant is received; and
   transmit acknowledgement/negative-acknowledgement (ACK/NACK) feedback for the downlink transmission at a second time triggered by receipt of the downlink grant, the second time occurring during a second TTI, and the second TTI occurring later in time than the first TTI.

* * * * *